United States Patent [19]

Knauff

[11] E Patent Number: Re. 31,667

[45] Reissued Date of Patent: Sep. 11, 1984

[54] LOW COST ELECTROMECHANICAL ELECTRONIC SIMULATION CIRCUITS

[76] Inventor: Robert J. Knauff, P.O. Box 2270, Hollywood, Calif. 90028

[21] Appl. No.: 482,630

[22] Filed: Apr. 6, 1983

Related U.S. Patent Documents

Reissue of:

[64] Patent No.: 4,260,939
Issued: Apr. 7, 1981
Appl. No.: 931,551
Filed: Aug. 7, 1978

[51] Int. Cl.[3] ..... H04R 11/02

[52] U.S. Cl. ..... 318/558; 340/648; 446/397; 446/232

[58] Field of Search ..... 318/346-349, 318/305, 439, 558, 490, 660; 340/648, 392; 46/174, 227, 232, 229; 272/14; 335/6; 29/169.5

[56] References Cited

U.S. PATENT DOCUMENTS

| | | | |
|---|---|---|---|
| 1,144,388 | 6/1915 | Smith | 318/340 |
| 2,449,213 | 9/1948 | Frederick | 318/490 |
| 2,520,071 | 8/1950 | Tennefos | 116/202 |
| 2,752,588 | 6/1956 | Marmorstone | 340/648 |
| 2,838,863 | 6/1958 | Paul | 46/226 X |
| 3,006,239 | 10/1961 | Smolar | 340/648 |
| 3,538,639 | 11/1970 | Tomaro | 46/232 |

*Primary Examiner*—B. Dobeck
*Attorney, Agent, or Firm*—William H. Maxwell

[57] ABSTRACT

These circuits produce light, sound and similar effects in models or toys by taking advantage of current modulation produced in a commutator circuit of a two-pole motor which may be used to provide motion for at least a part of the model or toy incorporating one of the circuits. At least one additional effect-producing circuit element in addition to the motor is electrically connected to the commutator circuit. A battery or other means for applying sufficient electromotive force to the commutator for operation of the motor is electrically connected to the commutator circuit. When the additional effect-producing element is parallel to the commutator circuit, the battery supplies an insufficient amount of electromotive force to allow both the motor and the additional effect-producing circuit element to operate in their maximum current-drawing condition at the same time. A sufficient amount of electromotive force is supplied to allow either alone to operate in its maximum current-drawing condition. As a result, alternate making and breaking of connections to the commutator elements as the armature of the motor rotates produces a regular variation in the current supplied to the parallel additional effect-producing circuit element. A similar effect is produced with the additional effect-producing element in series with the commutator circuit regardless of the amount of electromotive force supplied by the battery. This modulation produces flashing or flickering of lights or sound effects, if a sound-producing element is employed as the additional effect-producing circuit element. These effects simulate the results obtainable with more complex electronic circuits.

35 Claims, 9 Drawing Figures

LOW COST ELECTROMECHANICAL ELECTRONIC SIMULATION CIRCUITS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates primarily to electromechanical circuits for use in models and toys. More particularly, it relates to such circuits which are able to produce light, sound and similar effects comparable to those which can be produced by use of more complex electronic circuitry. Most especially, it relates to such circuits in which current or voltage modulation or both, produced by operation of an electric motor, are used to produce light, sound and similar effects.

2. Description of the Prior Art

It is known in the art to employ various electronic circuits for the purpose of producing flashing lights, sirens, and other sound effects in toys and models. For example, the commercially available LM3909 Flasher-/Oscillator Circuit obtainable from National Semiconductor Corporation, Santa Clara, Calif., can be used for this purpose. Since such toys and models usually have considerably more market appeal if they incorporate motion as well, some form of a motor circuit is typically provided to produce the motion.

While great progress has been made in providing such circuits as the LM3909 on a high volume, low cost basis, it would be advantageous if it was possible to obtain light, sound and smilar effects without the provision of a separate electronic circuit for this purpose. While this can be achieved to some extent through use of cam-actuated contacts driven by the same motor that provides motion in the toy or model, it is difficult to provide enough variation in the effects produced by this method to give a realistic enough combination of effects. Consequently, that approach alone will not produce substantial cost savings when compared to the cost of providing the same effects with a separate electronic circuit. Toy and model manufacturers have therefore continued their efforts to provide these effects on a more cost effective basis.

SUMMARY OF THE INVENTION

Accordingly, it is an object of this invention to provide a novel, low cost electromechanical circuit capable of producing light, sound or similar effects in models or toys.

It is another object of the invention to simulate the light, sound and similar effects ordinarily produced by electronic circuits in a very low cost, electromechanical circuit. It is still another object of the invention to provide a circuit which employs modulation of electromotive force occurring in a commutator circuit to produce variations in light, sound and similar effects in a model or toy.

It is a still further object of the invention to provide a simple, low cost electromechanical model or toy circuit which is capable of simulating very closely variations in light, sound and similar effects produced during actual operation of a device represented by the model or toy.

The attainment of these objects may be achieved through use of the novel electromechanical model or toy circuit of this invention. A circuit in accordance with the invention includes a two pole commutator motor for producing motion of at least a portion of the model or toy in which the circuit is employed. Means is electrically connected to the motor in a commutator circuit for applying sufficient electromotive force to the commutator for operation of the motor. At least one additional effect-producing circuit element, such as a lamp, light emitting diode or speaker, is also electrically connected to the commutator circuit. The electromotive force applying means, such as a battery, supplies an insufficient amount of electromotive force to allow both the motor and the additional effect-producing element to operate in their maximum current-drawing condition when the element is connected parallel to the motor. The electromotive force applying means should apply sufficient electromotive force in such parallel circuits to allow either the motor alone or the additional effect-producing element to operate in its maximum current-drawing condition. This means that, when the commutator circuit is drawing maximum current during operation, little or no additional current is available for operation of the additional effect-producing circuit element. In the case of effect-producing circuit elements in series with the commutator circuit, interruption of current flow in the commutator circuit also interrupts current flow in the effect-producing element. The electromotive force applying means therefore need not satisfy the above limitation applicable to parallel circuits. Since the commutator circuit is alternately connected and disconnected to the electromotive force applying means as the armature of the motor rotates, the result is alternate surges and depletions of available current to the additional effect-producing circuit element, thus providing signals with regular modulation that will give flickering or flashing lights, generation of sound, or other similar effects. Further variations in the effects may be produced with cam-actuated switches, selectively connectable diode strings, or potentiometers.

By taking advantage of the regular current or voltage variations which occur in the electromechanical circuit in this manner, light, sound and similar effects only hitherto obtainable through use of more complex electronic circuits, may be achieved at substantially lower cost. The attainment of the foregoing and related objects, advantages and features of the invention should be more readily apparent after review of the following more detailed description of the invention, taken together with the drawings, in which:

DETAILED DESCRIPTION OF THE INVENTION

Figures 1, 1A:
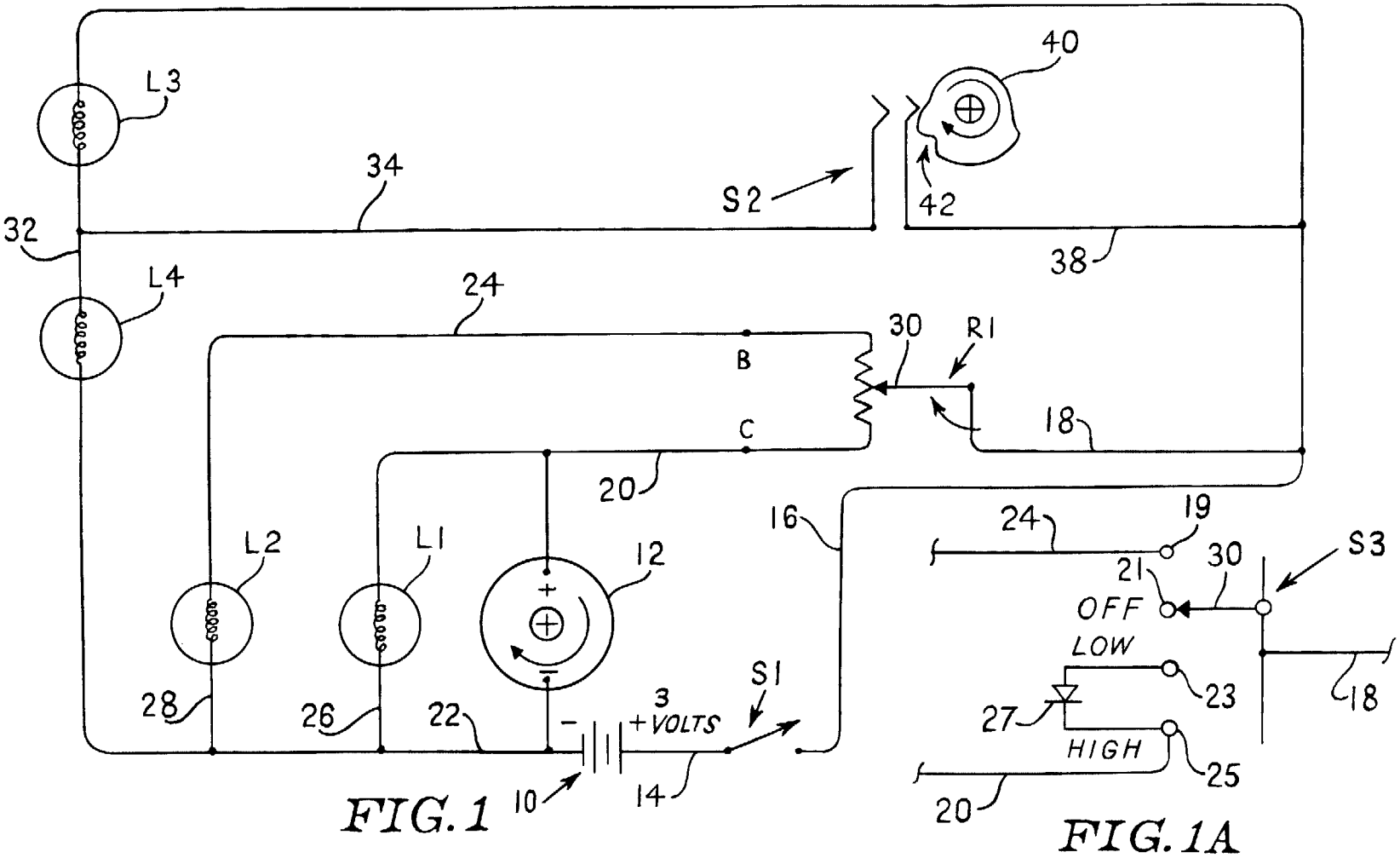
FIG. 1 is a schematic diagram of a circuit in accordance with the invention.
FIG. 1A is an alternative form of a portion of the circuit shown in FIG. 1.

Turning now to the drawings, more particularly to FIG. 1, the circuit diagram there shown illustrates the elements of the invention in one embodiment. As shown, batteries 10, shown to represent two series connected AA dry cells to produce an output potential of 3 volts, are serially connected to the commutator circuit of two-pole motor 12 by means of lines 14, 16, 18, 20 and 22. On/off switch S1 is connected between lines 14 and 16. Wire wound rheostat R1 forms a 3-way connection between lines 18, 20 and 24. Lamp L1 is connected in parallel with the commutator of motor 12 by means of lines 20 and 26, which connects L1 to line 22. Lamp L2 is connected to line 24 and line 28, which connects it to line 22.

In operation, closure of switch S1 provides electromotive force from the batteries 10 to the circuit. Depending on the position of wiper 30 of the rheostat or potentiometer R1, the electromotive force is divided between lamp L2 and the commutator circuit of motor 12 plus lamp L1.

Line 16 is also connected to lamp L3 in another circuit path. Lamp L3 is connected to lamp L4 by means of line 32. Line 32 is connected to line 16 by means of line 34, cam-actuated switch 52 and line 38. Although cam-actuated switch 52 is actuated by means of a shaft rotated by motor 12, it is shown separated therefrom in FIG. 1 for the purpose of clarity in the circuit. It should further be noted that cam 40 is double cut, as indicated at 42, to provide a good flashing action for lamps L3 and L4 during operation of the circuit, as will be explained in more detail below.

In an actual embodiment of the circuit shown in FIG. 1, a commercially available Mabuchi two-pole model FA132-2280 motor having a maximum load of 300 milliamps (ma.) is employed with lamps L1–L4, each having a maximum drain of 100 ma each. If it is desired to have L2 be completely extinguished when wiper 30 of rheostat R1 is set to provide maximum power to motor 12, a maximum 30 ohms at 5 watt rheostat should be employed, instead of a 20 ohm 5 watt rheostat.

It is important that a two-pole motor be used in these circuits. Motors with three or more poles produce such rapid fluctuations in current or voltage that flickering or flashing of lamps connected to their commutator circuits tends not to be visible due to persistence of vision in the human eye at the typical revolutions per minute (RPM) employed in toy and model motors. Similarly, motors with more than two poles do not produce large enough current spikes in operation to allow production of sound effects through speakers or other sound producing devices connected in the motor circuits.

The operation of the circuit of FIG. 1 will now be explained, assuming that the circuit is incorporated in a model helicopter, with lamps L1 positioned at an exhaust port of the model, L2 as a cabin light, L3 as a tail light and L4 as a radar light. In normal operation rheostat R1 is initially set so that maximum current flow occurs through cabin lamp L2, with little or not current flow through the alternative circuit path including motor 12 and exhaust lamp L1. Switch S1 is then closed, turning on lamps L2, L3 and L4 in their maximum current drawing condition. To simulate start-up of the helicopter, wiper 30 of rheostat R1 is moved toward line 20, downward as shown in FIG. 1, slowly increasing the amount of current supplied to motor 12 and exhaust lamp L1 and reducing the amount of current supplied to cabin lamp L2. Assuming that cam-actuated switch S2 is in the open position at this time, the series circuit including tail lamp L3 and radar lamp L4 only allows 50 percent voltage potential to each lamp, and L3 and L4 are therefore at half brilliancy.

Since motor 12 is a two-pole motor, it is not self starting. This means that motion must be initiated between a rotor driven by the motor 12 and the body of a helicopter in which the motor 12 is mounted, as will be explained in more detail below.

As the armature of motor 12 rotates, its shaft causes cam 40 to close switch S2, thus bypassing tail lamp L3 out of the circuit, allowing radar lamp L4 to go to full brightness. This effect, if properly designed, gives the illusion of the radar lamp throbbing rather than flashing. Since the tail lamp L3 is bypassed out of the circuit, it has more of a flashing action since its filament is allowed to cool. Double cut 42 provides a good flashing action as motor 12 begins to rotate. As the RPM of the motor 12 increases, cam 40 activates switch S2 so rapidly that the lamps L3 and L4 cannot respond to the double cut action. In this manner, good flashing action is provided at both low and high RPM's of motor 12.

As the armature of motor 12 rotates, it alternately connects and disconnects its commutator circuit. At the time the commutator of motor 12 is drawing current, there is insufficient current being supplied by batteries 10 to allow lamp L1 to light up. When the commutator is not drawing current, lamp L1 draws its maximum current and lights up.

FIG. 1A shows how a single pole-four pole switch can be substituted for the rheostat R1 in FIG. 1 to achieve a similar effect in the circuit disclosed there. Switch S3 has a movable contact 30 connected to line 18 as in FIG. 1. Switch S3 has a fixed contact 19 connected to line 24, a fixed contact 21 representing the off position for the switch, a low position fixed contact 23, and a high position fixed contact 25. Low position contact 23 and high position contact 25 are connected together through diode 27.

In this embodiment, movable contact 30 must engage fixed contact 19 in order for lamp L2 in FIG. 1 to be turned on. With movable contact 30 engaging fixed contact 21, the circuit is off. With movable contact engaging fixed contact 23, lamp L2 is off, and motor 12 operates at a relatively low speed, due to the voltage drop through diode 27. With the movable contact engaging fixed contact 25, the diode voltage drop is eliminated, and motor 12 operates at higher speed. When the movable contact engages either fixed contact 23 or 25, the motor produces a flashing action in lamps L1 and L3 and a flickering action in lamp L4 in the same manner as explained with reference to FIG. 1

Figure 2:
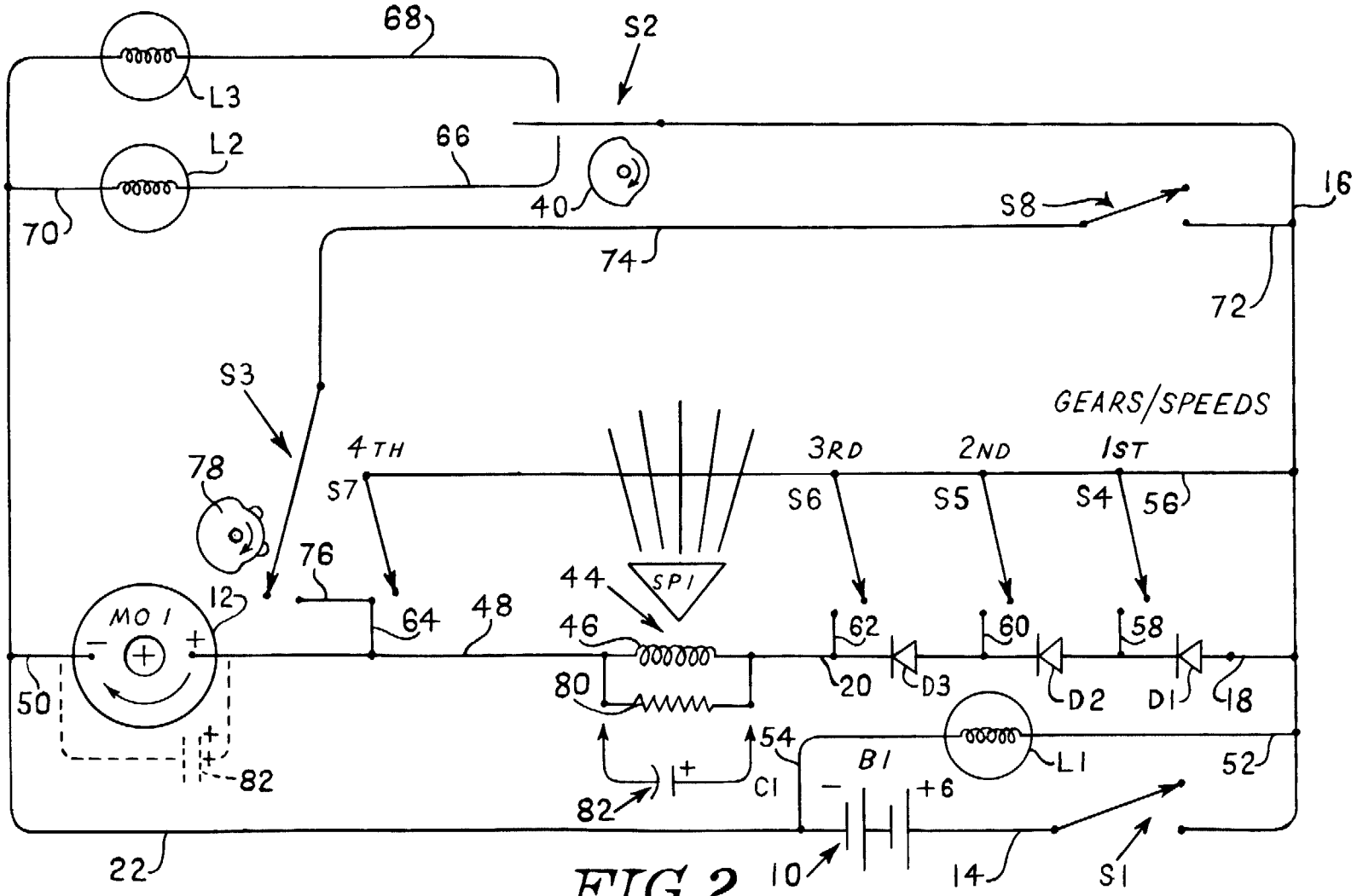
FIG. 2 is a schematic diagram of another embodiment of a circuit in accordance with the invention.

FIG. 2 shows another embodiment of a circuit in accordance with the invention, in which a speaker 44 is operated by means of current modulation produced by operation of motor 12. In a similar manner to that of FIG. 1, the motor 12 is connected to batteries 10 by means of line 14, switch S1, line 16, line 18, diodes D1–D3, line 20, voice coil 46 of speaker 44, line 48, line 50 and line 22. Another circuit path is provided through lamp L1 by means of lines 52 and 54. A conductive bus 56 includes switches S4–S7, which contact lines 58, 60, 62 and 64 respectively, for the purpose of selectively deleting diodes D1–D3 and speaker 44 from the circuit including motor 12.

Switch S2, a single pole, double throw 50 percent duty cycle switch is actuated by cam 40 to make alternate contact to lines 66 and 68, connected respectively to lamps L2 and L3. Lamp L3 is connected to line 22 to complete its circuit path, and lamp L2 is similarly connected to line 22 by means of line 70.

Another circuit path is provided through switch S8, connected to line 16 by line 72, and to cam-actuated switch S3 by line 74. Cam-actuated switch S3 is connected to line 76 to complete this other circuit path. Both cam 40 of switch S2 and cam 78 of switch S3 are actuated by rotating shaft of motor 12. As in the case of FIG. 1, these cams have been separated from motor 12 for clarity in showing the circuit. These cams are preferably driven by reducing gears from the shaft of motor 12. A different amount of reduction for each cam is preferred to give a different periodicity to the effects associated with them.

A bypass resistor 80 is connected in parallel with the voice coil 46 of speaker 44. If the current carrying capacity of voice coil 46 is sufficient, the bypass resistor 80 may be omitted. If desired, a mute capacitor 82 can also be connected in parallel with the voice coil 46, to give a softer sound from speaker 44. The same result can be achieved by connecting a mute capacitor 82 in parallel with motor 12, as shown in dotted line in FIG. 2.

Motor 12, as in FIG. 1, is a Mabuchi MO-1 two-pole motor. It is preferred to use a model No. FA132-2280 standard brush or model No. FC132-2280 carbon brush motor for heavier loads, both of which are inertia start motors. A mechanical kick start, a flip start, or an electrical start as explained below, is then provided in a model or toy incorporating this circuit in order to initiate rotation of the motor's armature. With this circuit, four C size batteries are desirably employed to give an output voltage of 6 volts. Lamps L1–L3 are 6 volt/100 ma. maximum current lamps or may be replaced with light emitting diodes (LED's) if desired. Speaker 44 is a 2¼ inch, 8 ohm, 0.25 watt speaker. Diodes D1–D3 are 1N4001 type of at least 50 amps surge power. Bypass resistor 80 is a 5–10 ohm, 1 watt carbon or carbon film resistor. Mute capacitor 82 is a 50–500 microfarad or higher at 16 volts capacitor, depending on the amount of muting desired.

Operation of the circuit in FIG. 2 will now be explained, assuming that the circuit is installed in a model motorcycle. Switch S1 is closed to begin operation of the circuit. This turns on lamp L1 and provides current for operation of motor 12 through diode D1–D3 and voice coil 46 of speaker 44. Motor 12 doe not begin to operate until the needed initial motion has been imparted to its armature, and closing switch S1 simply turns on lamp L1. In a model or toy motorcycle, this is done by a mechanical kick start lever (not shown), which simulates the action of starting the engine of a motorcycle. Due to the voltage drop of about 0.8 volts per diode through diodes D1–13, the initial rotation of the armature of motor 12 is considerably slower than its maximum rotation rate.

As in the case of FIG. 1, alternate making and breaking of electrical contact with the commutator plates of motor 12 produces current surges in the circuit including diodes D1–D3, speaker coil 46 and motor 12. These regularized current surges produce audible sounds from speaker 44, which simulate the sound of an idling internal combustion engine. In this manner the sounds are produced without the provision of extra electronic circuitry for generating pulses suitable for generation of sound from a loudspeaker.

At the same time rotation of the motor armature also rotates cam 40 to actuate switch S2, thus alternately completing a circuit including lamps L2 and L3, causing them to flash alternately. This action can be used to simulate the flashing lights on a police motorcycle.

Gear shifting is simulated by successively closing switches S4–S6 to succesively bypass diodes D1–D3 from the circuit including speaker 44. As each diode is bypassed, its 0.8 voltage drop is eliminated, causing the armature of motor 12 to rotate more rapidly. This more rapid rotation produces more rapid making and breaking of contact to the commutator plates, producing a sound from speaker 44 simulating an internal combustion engine running at a higher RPM rate. In a similar manner, closing switch S7 serves to bypass speaker 44 from the circuit. This is done when a mechanical siren (not shown) is mechanically connected to the rotating shaft of motor 12. Applying the electromotive force from batteries 10 directly to motor 12 in this manner causes its armature to rotate at a high enough speed to produce a siren sound, which would dominate over the sound from speaker 44 in any event. A warbling siren sound can be produced by closing switch S8, thus allowing rotation of cam 78 of switch S3 to alternately make and break contact with line 76 to apply the electromotive force directly to motor 12 and bypass both the diodes D1–D3 and speaker 44. Cam 78 is desirably driven by a different gear reduction than used to drive cam 40, thus producing a different periodicity in the warbling siren as opposed to the flashing lamps of L2 and L3.

Figure 3:
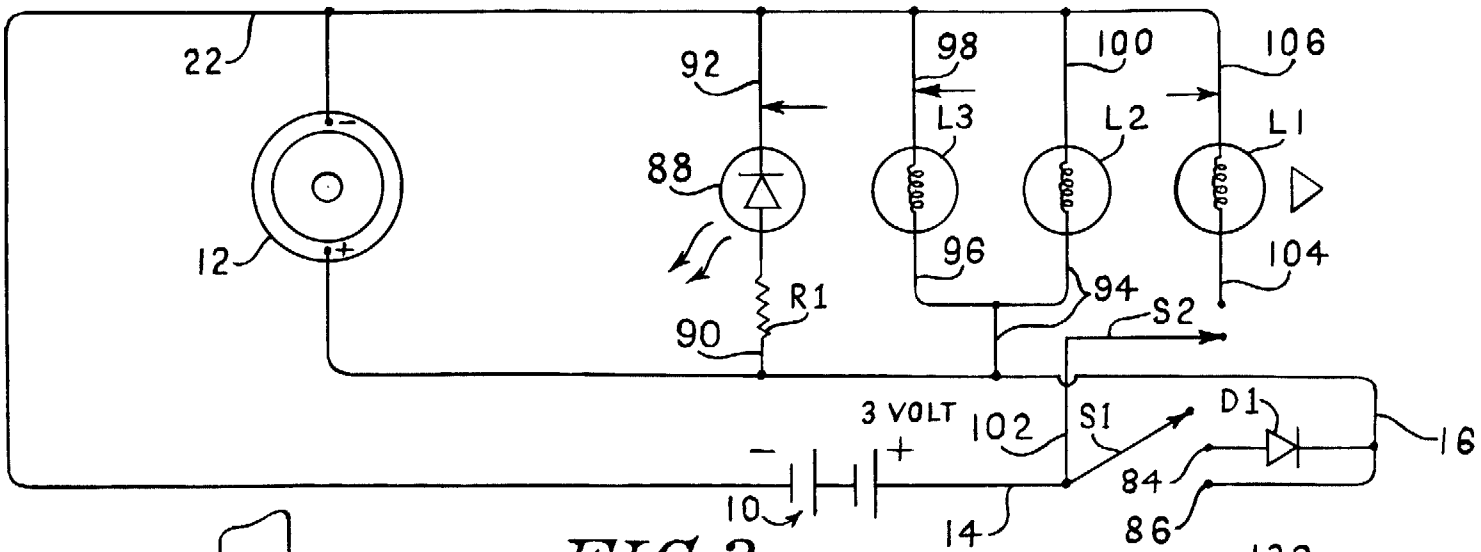
FIG. 3 is a schematic diagram of a third embodiment of a circuit in accordance with the invention.
Figure 5:
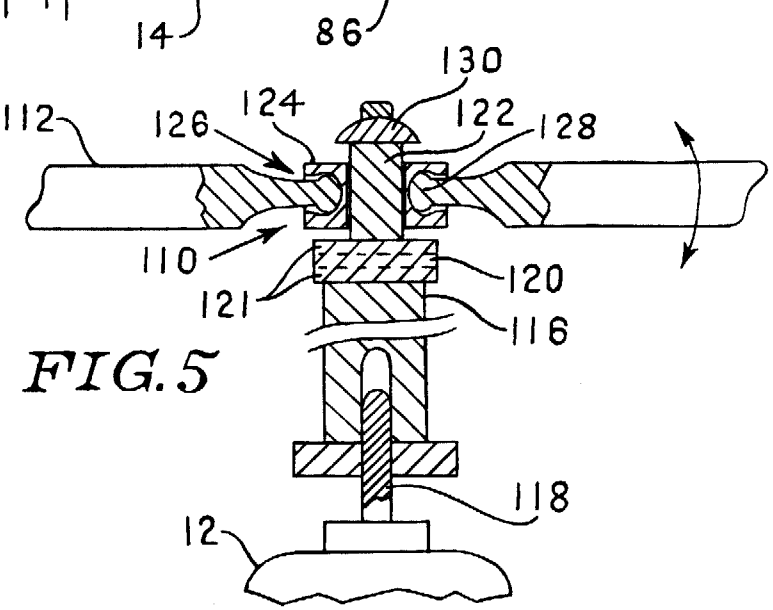
FIG. 5 is a side view of the element shown in FIG. 4, with a partial section taken along the line 5—5' shown in FIG. 4.
Figure 4:
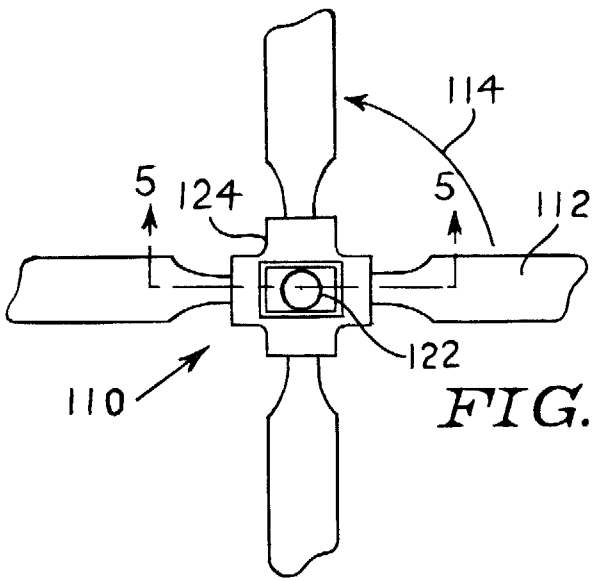
FIG. 4 is a top view of a mechanical element that may be employed with the circuits of FIGS. 1–3.

FIGS. 3, 4 and 5 show another embodiment of a circuit in accordance with the invention, together with a model or toy helicoptor rotor design that may be employed with the circuit in FIG. 3 to produce the characteristic chop noise of helicopter rotor blades. As before, battery 10 is connected to the commutator circuit of motor 12 by line 14, switch S1, line 16, and line 22. In this circuit, an output potential of 3 volts is desired from battery 10, which can be obtained by 2 AA type batteries, serially connected. Switch S1 is shown as a single pole, 3-pole switch in order to provide off, low and high operating conditions. Terminal 84 is connected to line 16 through diode D1, thus giving a 2.2 volt potential as applied to motor 12, rather than the 3.0 volt potential obtained if contact is made to terminal 86, thus avoiding the diode voltage drop. LED 88 is connected in parallel with the commutator circuit of motor 12 by means of lines 90 and 92. Ballasting resistor R1 is provided for protection of LED 88 in a conventional manner. Lamps L2 and L3 are also connected in parallel with the commutator circuit of motor 12 by means of lines 94, 96, 98 and 100. An alternative circuit path is provided through lamp L1 on line 102, through switch S2, lines 104, 106 and 22. When switch S2 is closed, L1 can thus be turned on in a flickering fashion to simulate a spotlight. A clear plastic lens 108 can be provided in the body of the helicopter to make the spotlight simulation more striking in effect.

The operation of this circuit is similar to that of the circuits in FIGS. 1 and 2. Current surges through the motor as contact is made with the commutator plates produce corresponding current drops in LED 88 and lamps L2 and L3 due to a shunting effect, thus producing a periodic flashing or flickering effect in the LED and the lamps, depending on whether the current through the LED and lamps is low enough when it is at a maximum through the commutator circuit to extinguish the lamps and the LED or merely reduce the intensity of light produced by them.

In an actual embodiment, lamps L1–L3 draw a current of 100 ma. maximum at 3 volts. Ballast resistor R1 is between 5 and 20 ohms, depending on the characteristics of the particular LED employed. In this circuit, it is preferred to use the same type of inertia start motor employed in the circuit of FIG. 2. However, assuming that the motor 12 is used to drive the rotor 110 (shown in FIGS. 4 and 5), a different method of initiating rotation of the armature of motor 12 may be employed. Assuming that the motor 12 rotates to turn blades 112 of the rotor 110 in a counterclockwise direction as shown by arrow 114 in FIG. 4, the rotor 110 is moved backwards in a clockwise direction until one of the lamps in a most visible position, such as lamp L3 if used as a tail light for the helicopter, dims, showing that contact has been made with the commutator circuit. The rotor 110 is then released, and the magnets of motor 12 pull the armature forward. As a result, sufficient momentum is imparted to the rotor 110 to initite rotation of the motor armature. The same result can also be achieved by rotating the body of the helicopter in a counterclockwise direction to produce the same relative motion between the body and the rotor. The circuit then operates in the same manner as described above for the circuits of FIGS. 1 and 2, with the current surges in motor 12 producing the flickering or flashing of lamps L2 and L3 and LED 88. Since LEDs will respond to current or voltage variations more rapidly than lamps L2 and L3, flickering or flashing of LED 88 will appear to be different from that of lamps L2 and L3, even though they are produced from the same current or voltage variations. Typically, a green LED is employed, and it is used to simulate a radar light. Switch S1 is used to provide a lower speed of operation or a higher speed of operation of the circuit, depending on whethere contact is made with terminal 84 or terminal 86.

FIGS. 4 and 5 show details of the helicopter rotor 110, which produce a simulation of the characteristic chopping noise of rotating helicopter blades 112. Rotor support 116 is mounted on shaft 118 of motor 12 in a direct drive press fit. Rotor support 116 and the other parts of the rotor assembly are desirably formed of molded plastic. A slip clutch 120 consisting of facing discs 121 of plastic is indicated at 120 and is provided to prevent damage by forced turning of blades 112 or interference with their rotation in use. Member 122 has a generally rectangular cross-section, as best seen in FIG. 4, and extends through hub 124 with substantial clearance so that it floats in hub 124. Blades 112 similarly extend loosely into apertures 126 around the sides of hub 124. End 128 of each blade 112 is then beaded to retain it in place loosely in hub 124. A pop-on hub member 130 is provided to keep rotor 110 in place on member 122.

Since the armature of two-pole motor 12 rotates with more of a snapping than a steady action, member 122 snaps against the sides of hub 124, and the ends of blades 112 also move within their apertures in hub 124 during rotation. These movements produce sounds which approximate the characteristic chopping noise of helicopter blades. When the attitude of the model or toy helicopter is changed while the blades are rotating, there is also a change in the blade noise as would occur in operation of an actual helicopter.

Figure 6:
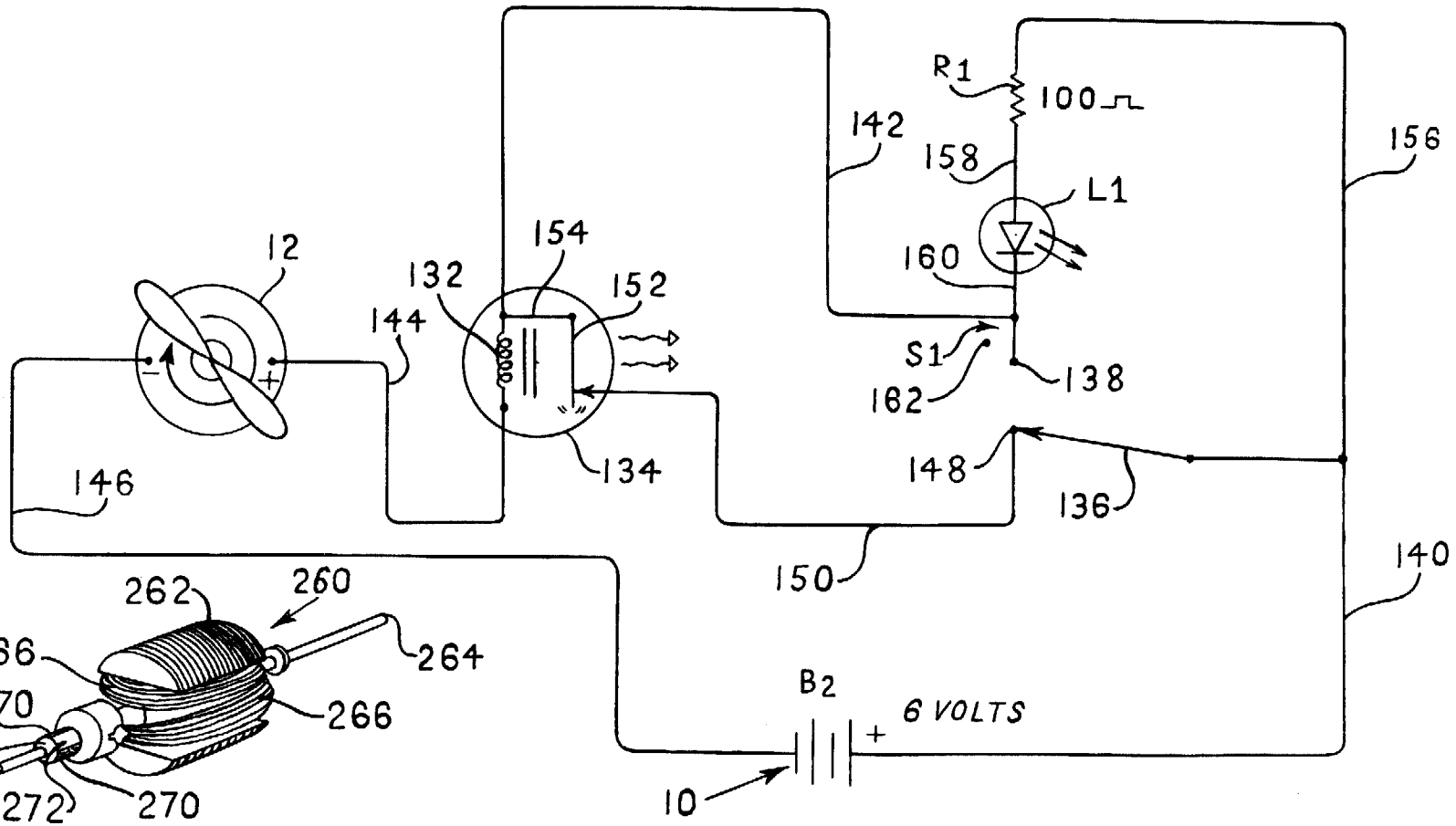
FIG. 6 is a schematic diagram of yet another embodiment of the invention.

FIG. 6 shows another embodiment of the invention, in which the novel electromotive force modulation technique is employed to produce two different sound effects as well as a flashing light effect. Battery 10, shown as providing a six-volt positive potential, preferably consists of four AA size alkaline dry cells. It is connected in series with coil 132 of buzzer/clicker 134 and the commutator of motor 12 in two different paths. With moving contact 136 of switch S1 engaging contact 138, the circuit path is through line 140, the movable contact 136, line 142, the coil 132, line 144, the armature of motor 12, and line 146. With the movable contact 136 of switch S1 in position engaging contact 148, the series path is line 140, movable contact 136, line 150, make and break contact 152 of buzzer/clicker 134, line 154 and from coil 132 in the same path as the remainder of the other path. Resistor R1 and LED L1 are also connected to battery 10 by means of lines 156, 158 and 160.

In operation of this circuit resistor R1 and LED R1 are shunted out of the circuit when movable contact 136 of switch S1 is in position against contact 138 due to the resulting circuit bypass configuration. On the other hand, when movable contact 136 engages contact 148 of switch S1 the positive potential is supplied to resistor R1 and LED L1. Switch S1 preferably also has enough space between contacts 138 and 148 so that movable contact 136 may be positioned intermediate between the contacts 138 and 148 at position 162 to provide a momentary off condition.

With the movable contact 136 engaging either contact 138 or contact 148 of switch S1, modulation of the current flow in the circuit due to alternate making and breaking of contact with the armature in the commutator circuit of motor 12 serves to modulate current flow through coil 132 of the buzzer/clicker. With the movable contact 136 engaging contact 138, a clicking sound is produced with each variation of the current flow due to the alternate making and breaking of contact with the armature of motor 12. This second occurring in rapid repetition as the motor 12 rotates provides a good simulation of the sound of an airplane engine. With movable contact 136 engaging contact 148, buzzer/clicker 144 operates in its buzzer configuration and the resulting sound simulates the combination of an airplane engine and the firing of a machine gun. At the same time, with the movable contact in this position, current is also supplied to LED L1. LED L1 can therefore be used to simulate the flash of light accompanying the gun fire. When incorporated in a model airplane, the movable contact 136 can also be moved to the intermediate position 162 momentarily to simulate a missing engine. Since motor 12 must be rotating in order for the circuit to draw current, no separate on/off switch is required in the circuit. This circuit thus provides three different sound effects and a light flashing effect, all relying on the current modulation produced by operation of the two-pole motor 12.

Figure 7:
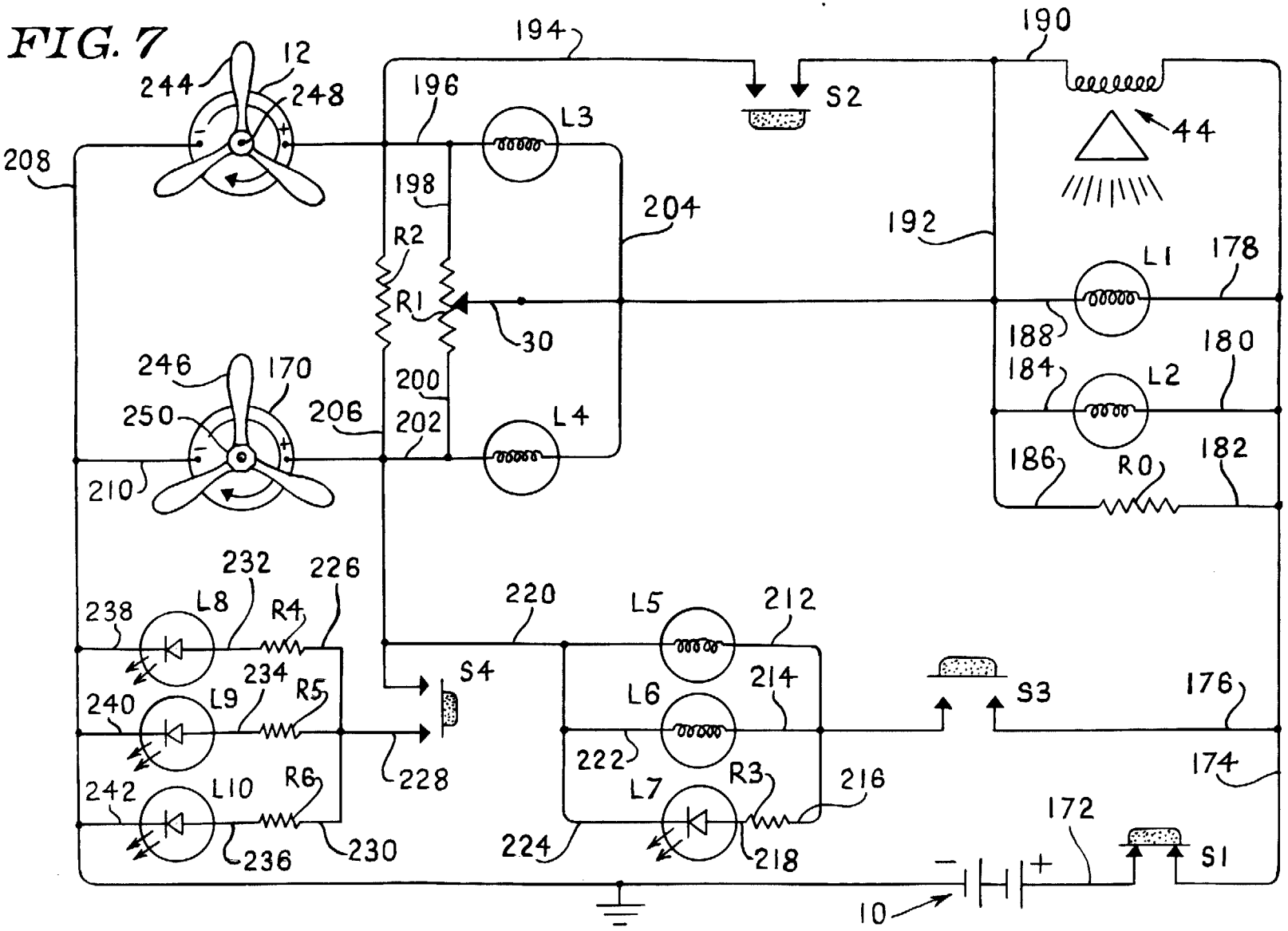
FIG. 7 is a schematic diagram of still another embodiment of the invention.

FIG. 7 is another embodiment of the invention in which a first two-pole motor 12 as in the previous embodiments, together with a second motor 170 of the same type, are employed to give even more variation in the effects that can be produced through use of the invention as previously described. Battery 10 is connected to normally on momentary pushbutton switch S1 by connection 172. From connection 174 on the other side of switch S1, there is an upper circuit path, in which current flow occurs through the motors 12 and 170, and a lower circuit path, including connection 176. The upper circuit path includes speaker 44 on line 174 and parallel connections 178, 180 and 182, connected respectively to lamps L1 and L2 and resistor R0. Connections 184 and 186 on the other side of lamp L2 and resistor R0 are connected to connection 188 on the other side of lamp L1 and connection 190 on the other side of speaker 44 by connection 192. Connection 190 connects speaker 44 to normally off momentary pushbutton switch S2, and, through connection 194 and 196, to resistor R2 and motor 12. Connection 188 and its parallel connections 190, 184 and 186 are connected to movable contact 30 of variable rheostat R1, which is connected by lines 198 and 200 between connections 196 and 202. Connection 204 joins lamps L3 and L4, which are also connected to connections 196 and 202, respectively.

Connection 206 joins resistor R2 to normally off momentary pushbutton switch S4, and, by way of connection 202, to motor 170. Connection 208 joins motor 12, and with connection 210, motor 170 back to battery 10.

In the lower circuit path, connection 176 joins connection 174 through normally off momentary pushbutton switch S3, to three parallel connections 212, 214 and 216. Lamps L5 and L6 are connected to connections 212 and 214, respectively. LED L7 is connected to connection 216 by means of resistor R3 and connection 218. Connections 220, 222 and 224 respectively connect lamps L5 and L6 and LED L7 to connection 206.

Connections 226, 228 and 230 connect the switch S4 to resistors R4, R5 and R6. Connections 232, 234 and 236 connect the other side of resistors R4, R5 and R6 to LEDs L8, L9 and L10, which are joined to connection 208 by connections 238, 240 and 242, respectively.

Propellers 224 and 246 are mounted on the rotatable shafts 248 and 250 of motors 12 and 170, respectively. With such propellers, the circuit can be used in twin engine airplane models. Since the propellers 244 and 246 represent a mechanical load on the motors 12 and 170, they affect the RPM of the motors in operation of the circuit. If it is desired to employ the circuit in a model or toy which does not contain two identical elements to be driven, a nut or other suitable object should be mounted on the rotating shaft of one of the motors to balance their loads if it is desired to have them operate under the same constraints. It should further be noted that a buzzer of the type indicated at 134 in FIG. 6 can be substututed for the speaker 44 shown in FIG. 7. Such a buzzer should be wired in a relay/clicker configuration, as in FIG. 6.

In operation of the circuit in FIG. 7, there is no current flow in the circuit with S1 in its normally closed position until motors 12 and 170 are flip started as in the previous embodiments, unless both switches S3 and S4 are closed to bypass the motors. However, with either or both motors 12 and 170 rotating, all of the circuit elements in a series path with battery 10 and the motors become activated as well. Switches S3 and S4 may then be used for selective activation of elements L5–L7 and L8–L10, respectively. Since elements L8–L10 are connected in a parallel circuit path to battery B1 to the primary circuit path between battery B1 and motors 12 and 170, their actuation is in accordance with the description above for other circuit elements in parallel with the motors. This circuit does not require a static on-off switch, since rotation of the motors is necessary for current flow. Such a switch consequently has been replaced with the normally on pushbutton switch S1, which serves two purposes. First, it can be used to create a missing motor sound by creative manipulation. Second, it can be used to turn the circuit off by depressing it long enough for rotation of the motors 12 and 170 to stop.

When flip-started, the commutators of motors 12 and 170 pull a pulsating current/voltage through a guaranteed RPM feedback balancing network consisting of R1, R2, L3 and L4. The noise that is produced in speaker 44 and illumination of lamps L1 and L2 are a direct result of the commutator make and break action in motors 12 and 170, as in the previous embodiments. If movable contact 30 of rheostat R1 is in its center position to balance the current/voltage equally between motors 12 and 170, they should rotate at approximately the same RPMs, assuming that L3 and L4 have the same internal resistance characteristics. Once rotation of them has been initiated, motors 12 and 170 may be adjusted to a symmetrical RPM mode or an asymmetrical RPM mode by balancing rheostat R1 to shift the current/voltage potential between the motors. Resistor R2 is in the current to act as a feedback device, which allows the motors 12 and 170 to interact. When activated, motor 12 generates one tone or frequency through speaker 44 and motor 170 generates another tone. Adjustment of the rheostat R1 also allows the motors to be tuned to produce a third overtone or beating effect, both through speaker 44 and on the flashing lights, thus creating muliplex sound and lighting effects.

Switch S2 allows the rheostat of R1 to be bypassed in the circuit, thus acting to "rev up" the motor 12 and 170 when it is depressed, by coupling the positive potential of the four circuit elements 44, L1, L2 and R0 to the motors 12 and 170. This allows simulation of the "rev up" condition in the engines of a model airplane incorporating the circuit. Activating switch S3 allows lamps L5 and L6 and LED 7 to become illuminated, as well as boosting the RPM of motors 12 and 170. Depressing switch S4 activates LEDs L8–L10 in a similar manner. These lamps and LEDs are rapidly pulsed or modulated due to rotational shunting in the case of LEDs L8–L10 or series switching action of the commutators of motors 12 and 170 in the case of lamps L5 and L6 and LED L7.

A silent running condition may be created for motors 12 and 170 by tuning the motors 12 and 170 through adjustment of rheostat R1 until they are 180° out of phase. In this condition, when motor 12's commutator is electrically open and motor 170's commutator is electrically closed or vice versa, a continuous current drain is set up instead of a pulsed current drain through speaker 44, which now generates very little sound. If 180° out of phase, the motors 12 and 170 are in perfect electrical harmony, because each motor takes its turn using the electromotive force from battery 10. Feedback resistor R2 allows the motors to monitor each other, thus keeping a phase locked situation. This silent running condition may be altered in three different ways. By blowing a disruptive air current on the propellers 244 and 246, an RPM imbalance may be created. Pushing switches S1, S2, or S3 detunes rheostat R1 electrically. Physically twisting or turning a model or toy incorporating the circuit causes a mechanical influence on rotation of motors 12 and 170, since their armatures in effect act like miniature gyroscopes.

In practice, R0 typically has a value between 5 and 10 ohms, depending on current demands. Its presence serves to boost the energy supplied to motors 12 and 170. Lamps L1–L6 are three volt/80 to 100 ma. maximum current lamps. LEDs L7–L10 are preferably red LEDs. If desired, the lamps L1 and L2 may be replaced with 226 type LEDs, which change color from yellow at higher current flows to red-orange at lower current flows. Depression of switch S2 would then change their color from red-orange to yellow, due to increased current flow through them with rheostat R1 bypassed out of the circuit. R1 is a 20 ohm variable rheostat with a 2–5 watt rating. R2 is desirably a 2.5 ohm, 1 watt film or carbon resistor. R3 is a 10–30 ohm, ¼ watt film resistor, with the precise value depending on the type of LED employed. R4–R6 are 100 ohm, ¼ watt, film resistors. Motors 12 and 170 are Mabuchi model FA 132-2280 or model FC132-2280 motors, for heavy duty loads. Battery 10 is a 6 volt alkaline battery pack. Speaker 44 is desirably an 8 ohm, 2¼" diameter 0.25 watt minimum speaker.

Figure 8:
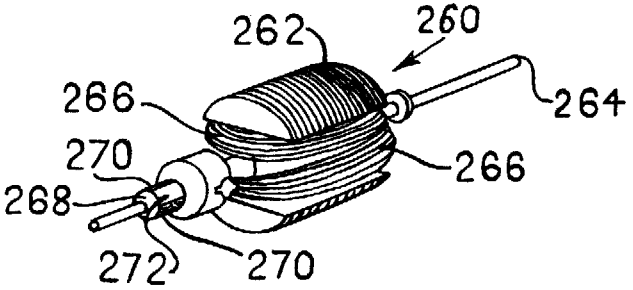
FIG. 8 is a perspective view of a portion of an electric motor suitable for practice of the invention.

FIG. 8 shows a commutator 260 of a motor suitable for use in practicing the invention. The commutator includes a laminated iron core 262 fixedly mounted on shaft 264 and having coils 266 wound around it. An insulating sleeve 268 is also fixedly mounted on shaft 264 and carries two commutator contacts 270, separated from each other by a substantial gap 272. In this preferred form, the two commutator contacts and two gaps divide up the circumference of sleeve 268 into approximately equal sectors. In order to provide the light and sound effects in accordance with the invention, it is important that there be a substantial gap between the commutator contacts. Otherwise, there would not be sufficient time between surges of current flow for relaxation of a speaker diaphragm or for the flashing of lamps or LED's to be visible, due to the persistence of vision effect.

It should now be apparent that novel electromechanical circuits capable of achieving the stated objects of the invention have been provided. The circuits take advantage of current or voltage modulation present in a motor commutator circuit to produce flickering or flashing light effects as well as sound effects for moedls and toys. By using the commutator circuit in this dual fashion, the necessity to provide a separate electronic flashing circuit to produce these same effects is avoided. The effects therefore can be provided in models and toys at significantly lower cost.

It should further be apparent to those skilled in the art that various changes in form and detail of the invention may be made. It is intended that such changes be included within the spirit and scope of the appended claims defining the invention.

What I claim is:

1. A circuit for producing effects in a model, which comprises:

a two-pole armature and commutator motor having an on-off switching effect [and] for [producing motion of at least a portion of said model] *current modulation*, means for applying sufficient electromotive force through said commutator and to said armature for operation of said motor, and electrically connected to said motor in a commutator circuit, and at least one *first* effect-producing circuit element electrically connected *in parallel* to said commutator circuit, the switching effect of said two-pole armature and commutator motor serving to produce pulsed *current* modulation of the electromotive force supplied to said effect-producing circuit element to produce observable variation in effect thereby.

[2. The circuit of claim 1, wherein said effect-producing circuit elment varies between a high effect output condition and a low effect output condition by operation of the circuit.]

3. The circuit of [any one of claims] *claim* 1 [ and 2,] wherein said *first* effect-producing circuit element is an incandescent resistance lamp *that varies between a high effect ouput conditon and a low effect output condition by operation of the circuit* .

4. The circuit of [any one of claims] *claim* 1 [and 2,] wherein said *first* effect-producing circuit element is a light-emitting diode *that varies between a high effect output condition and a low effect output condition by operation of the circuit*.

5. The circuit of claim 1, additionally comprising means for selectively altering relative distribution of the electromotive force between the motor circuit and said *first* effect-producing circuit element and an additional effect-producing circuit including a light-producing circuit element.

6. The circuit of any one of claims 1 and 5, additionally comprising a switch operated by a cam mounted on a shaft rotated by said motor to connect and disconnect a second light-producing circuit element from said electromotive force applying means.

7. The circuit of claim 6, additionally comprising a third light-producing circuit element in series with said second light-producing circuit element, said third light-producing circuit element remaining connected to said electromotive force applying means when said cam rotated switch disconnects said second light-producing circuit element from said electromotive force applying means, said electromotive force applying means supplying an insufficient amount of electromotive force to allow both the second and the third light-producing circuit elements to operate in their maximum current drawing condition, but sufficient to allow said third light-producing circuit element alone to operate in its full current drawing condition.

8. The circuit of claim 1, wherein said *first* effect-producing circuit element is a loudspeaker.

9. The circuit of claim 8, additionally comprising means for varying the amount of electromotive force supplied to said motor and loudspeaker in incremental steps, the variation in the amount of electromotive force so applied producing a sound simulating the noise produced by an engine of a vehicle during gear shifting.

10. The circuit of claim 9, wherein said varying means comprises a plurality of diodes series connected to said electromotive force applying means and said motor, and a plurality of switches for selectively bypassing said diodes.

11. The circuit of claim 8, additionally comprising a muting capacitor parallel with said loudspeaker.

12. The circuit of claim 9, additionally comprising a siren mechanically connected to said motor, operation of said motor with varying electromotive force producing a siren sound.

13. The circuit of claim 1, wherein at least one additional effect-producing circuit element is electrically connected to the commutator circuit for producing a variation in the effect produced by said at least one *first* effect-producing circuit element.

14. The circuit of claim 13, wherein said additional effect-producing circuit element is series connected in the commutator circuit, the on-off switching of the commutator as it rotated interrupting the circuit path including both said at least one *first* effect-producing circuit element and said additional effect-producing circuit element.

15. The circuit of claim 14, wherein said additional effect-producing circuit element is a light-producing circuit element.

16. The circuit of claim 14, wherein said additional effect-producing circuit element is a sound-producing circuit element.

17. The circuit of claim 16, wherein said sound-producing circuit element is a buzzer connected in two alternate circuit means and one of which causes said buzzer to operate as a clicker, said circuit additionally including a switch for selecting one of the alternate circuit means.

18. The circuit of claim 13, wherein said additional effect-producing circuit element is connected in parallel with the commutator circuit, flow of current in the commutator circuit reducing current supplied to said additional effect-producing circuit element to produce a noticable variation.

19. The circuit of claim 18, wherein said additional effect-producing circuit element is a light-producing circuit element.

20. The circuit of claim 18, wherein said additional effect-producing circuit element is a sound-producing circuit element.

21. A circuit for producing effects in a model, which comprises;

a two-pole armature and commutator motor having an on-off switching effect [and] for [producing motion of at least a portion of said model] *current modulation*, means for applying sufficient electromotive force through said commutator and to said armature for operation of said motor, and electrically connected to said motor in a commutator circuit, and at least one effect-producing circuit element electrically connected *in parallel* to said commutator circuit, said electromotive force applying means supplying an insufficient amount of electromotive force to allow both said motor and said effect-producing circuit element to operate in their maximum power drawing condition, and sufficient to allow either alone to operate in its maximum power drawing condition.

22. The circuit of claim 21, wherein said effect-producing circuit element is a light-producing circuit element.

23. The circuit of claim 21, wherein said effect-producing circuit element is a sound-producing circuit element.

24. A circuit for producing effects in a model, which comprises:

first and second two-pole armature and commutator motors and each having an on-off switching effect and for producing motion of at least a portion of said model, means for adjustably applying sufficiently relative amounts of electromotive force through the commutators and to the armatures of and for the operation of each of said motors, and electrically connected to each of said motor armature circuits respectively, and at least one effect-producing circuit element electrically connected to the commutator of at least one of said motors, operation of at least one of said motors serving to produce sufficient modulation of electromotive force supplied through the commutator switch effect thereof to produce noticable variation in the effect produced by said effect-producing circuit element.

25. The circuit of claim 24, additionally comprising a balancing network wherein a said effect-producing circuit element is a resistance element connected in series to the commutator of each of said motors and with a variable resistance connected therebetween.

26. The circuit of claim 24, wherein said at least one effect-producing circuit element is series connected to the commutator of either of said motors.

27. The circuit of claim 24, wherein said at least one additional effect-producing circuit element is connected in parallel with the commutators of said motors.

28. The circuit of claim 27, wherein a first and second effect-producing circuit element are each series connected to the commutators of said first and second motors.

29. The circuit of claim 28, wherein at least one of said effect-producing circuit elements is a light-producing circuit element.

30. The circuit of claim 29, wherein at least one of said effect-producing circuit elements is a sound-producing circuit element.

31. The circuit of claim 24, wherein at least one light-producing circuit element is included as one of said additional effect-producing circuit elements.

32. The circuit of claim 31, wherein at least one sound-producing circuit element is included as one of said additional effect-producing circuit elements.

33. A circuit for producing effects in a model, which comprises:

an electromotive force means in an effect-producing circuit, a first effect-producing circuit element having a voltage responsive switching means for intermittently conducting electromotive force therethrough and responsive to said voltage to apply its effect to said model, and at least one second effect-producing circuit element electrically connected is series with the said first effect-producing circuit element and responsive to said voltage to apply its effect to said model, response of the said first effect-producing circuit element serving to intermittently respond the at least one second effect-producing circuit element so as to produce variation in effect thereby.

34. The effect producing circuit as set forth in claim 33, wherein there is a plurality of second effect-producing circuit elements connected in series with the said first effect-producing circuit element.

35. The effect producing circuit as set forth in claim 33, wherein there are parallel second effect-producing circuit elements connected in series with the said first effect-producing circuit element.

* * * * *